(12) United States Patent
Codeville

(10) Patent No.: US 7,376,443 B2
(45) Date of Patent: May 20, 2008

(54) METHOD FOR COUPLING THE MOBILE TERMINAL WITH THE ADAPTER

(75) Inventor: Sébastien Codeville, Shanghai (CN)

(73) Assignee: TCL Communication Technology Holdings Limited, Kowloon, Hong Kong (HK)

(*) Notice: Subject to any disclaimer, the term of this patent is extended or adjusted under 35 U.S.C. 154(b) by 313 days.

(21) Appl. No.: 11/077,987

(22) Filed: Mar. 11, 2005

(65) Prior Publication Data

US 2005/0208968 A1   Sep. 22, 2005

(30) Foreign Application Priority Data

Mar. 12, 2004  (CN) .................. 2004 1 0016917

(51) Int. Cl.
*H04B 1/38* (2006.01)
*H04M 1/00* (2006.01)

(52) U.S. Cl. ............... 455/557; 455/569.1; 455/569.2

(58) Field of Classification Search ............. 455/557, 455/569.2, 569.1
See application file for complete search history.

(56) References Cited

U.S. PATENT DOCUMENTS 5,495,241 A * 2/1996 Donig et al. ............ 340/870.39
5,524,044 A * 6/1996 Takeda ...................... 455/571
5,847,447 A * 12/1998 Rozin et al. ................ 257/678

OTHER PUBLICATIONS

B. Choi et al., "Design and Implementation of Low-Profile Contactless Battery Charger Using Planar Printed Circuit Board Windings as Energy Transfer Device," IEEE Transactions on Industrial Electronics, vol. 51, No. 1, Feb. 2004, XP-002332886, pp. 140-147.

* cited by examiner

*Primary Examiner*—George Eng
*Assistant Examiner*—Wesley Kim
(74) *Attorney, Agent, or Firm*—Morgan, Lewis & Bockius LLP

(57) ABSTRACT

The present invention provides a method for coupling the mobile terminal with the adapter. Firstly, coupling the mobile terminal with the adapter by RF induction; secondly, decreasing transmitted power of the mobile terminal so that the RF power leaking around is maintained below a specified value when the mobile terminal detects that it has been coupled with the adapter; finally, controlling the gain controlling means of the adapter by the mobile terminal to compensate the power loss due to the RF coupling and the transmitting power decreased by the mobile terminal itself, so that the transmitted power from the antenna of the adapter can reach the due power level transmitted by the mobile before it is coupled with the adapter. The structure of the mobile terminal is simplified and the price of the mobile terminal is decreased because the mobile terminal is coupled with the adapter through RF induction, and the RF changeover switch is not provided in the mobile terminal any more. Furthermore, the transmitting power in vehicle is always maintained below the European standard while the RF property of the mobile terminal is not degraded.

7 Claims, 2 Drawing Sheets

METHOD FOR COUPLING THE MOBILE TERMINAL WITH THE ADAPTER

RELATED APPLICATION

This application relates to and claims the benefit of priority from Chinese Patent Application No. 2004 10016917.7, filed on Mar. 12, 2004, the entirety of which is incorporated herein by reference.

TECHNICAL FIELD

The present invention relates to the mobile communication field, more specifically, to a method for coupling the mobile terminal with the adapter.

BACKGROUND OF THE INVENTION

At present, when a mobile telephone is used in vehicle, the transmitting power of the mobile phone in vehicle is required to be smaller than a certain standard value. European patent No. EP 0,692,885 A1, titled "Wireless Telephone", disclosed a wireless telephone apparatus comprising a portable wireless telephone set, an adapter and a car-kit, wherein the adapter includes a section of hand-free circuit coupled with the controlling section of the portable wireless telephone set through a controlling signal line; the wireless telephone set is coupled with the adapter through the coupling of the high-frequency signal, so that the signal of the wireless telephone is sent to an amplifying means of the car-kit through the adapter, amplified there and transmitted to the air from the antenna of the car-kit rather than the antenna of the telephone itself. Thus, when a mobile telephone or a portable telephone is used in vehicle, the telephone set will not have to be held in hand, and the speech information will enter directly the mobile phone or the portable phone through the section of hand-free circuit of the adapter; however, the transmitting power of the mobile phone in vehicle has to be higher, not conforming to the European standard in the future.

Alternative U.S. Pat. No. 5,524,044 disclosed that the mobile terminal will decrease its own transmitting power to a predetermined value when it has detected itself being coupled with the adapter of the car-kit so as to maintain the smaller transmitting power in vehicle, and after the mobile terminal is coupled with the adapter, it will switch off the connection of the RF module and the antenna of the mobile terminal using a changeover switch, so that the RF signal of the mobile terminal will be transmitted by the antenna of the adapter instead of its own antenna. However, in this patent documents, the changeover switch must be provided in the mobile terminal, and it is by the signal line that the mobile terminal is coupled with the adapter.

SUMMARY OF THE INVENTION

The object of the invention is to provide a method for coupling the mobile terminal with the adapter, wherein the mobile terminal will decrease its own transmitting power when it has been coupled with the adapter by induction and control the amplifying means of the adapter to amplify the transmitting power, so that the transmitted power from the antenna of the adapter can reach the due power level transmitted by the mobile terminal before it is coupled with the adapter, thereby the transmitting power in vehicle is always maintained below the European standard, while the RF property of the mobile terminal is not degraded. The method of the invention has the following steps: firstly, the mobile terminal is coupled with the adapter through RF induction, the coupling may be a capacitance coupling or other coupling without contact.

Next, when the mobile terminal has detected itself being coupled with the adapter, it decreases its own transmitting power, so that the RF power leaking around will be maintained below a specified value, the specified value may be below 20 mw.

Finally, the mobile terminal controls the gain of the gain controlling means of the adapter to compensate the power loss due to the RF coupling and the transmitting power decreased by the mobile terminal itself, so that the transmitted power from the antenna of the adapter can reach the due power level transmitted by the mobile terminal before it is coupled with the adapter.

For example, in order that the RF power leaking around is maintained below a specified value, a mobile terminal whose transmitting power is between 5th and 9th grade in GSM (Global System Mobile) or between zero and 3rd grade in DCS (Total Distributed Control System) decreases its own transmitting power by 10 dB, the power loss due to the coupling by RF induction being assumed to be 10 dB, then the mobile terminal controls the higher gain 20 dB increased by the amplifying means of the adapter to compensate the transmitting power decreased by the mobile terminal itself and the power loss due to the RF coupling.

A mobile terminal whose transmitting power is neither between 5th and 9th grade in GSM nor between zero and 3rd grade in DCS does not decrease its own transmitting power, the power loss due to the coupling by RF induction being assumed to be 10 dB, then the mobile terminal controls the lower gain 10 dB increased by the amplifying means of the adapter to compensate the transmitting power decreased by the mobile terminal itself and the power loss due to the RF coupling.

The advantageous effects of the invention are that the structure of the mobile terminal is simplified and the price of the mobile terminal will be decreased because the mobile terminal is coupled with the adapter through RF induction, and the RF changeover switch is not provided in the mobile terminal any more; moreover, the risk of power loss resulting from the RF changeover switch (liable to be contaminated by dust ) and the movable components (external RF coupler) will be reduced; furthermore, the transmitting power in vehicle is always maintained below the European standard because the mobile terminal decreases its own transmitting power when it has detected itself being coupled with the adapter, while the RF property of the mobile terminal is not degraded, so that the normal and fine communication can be ensured.

Other objects and achievements of the invention will be apparent, and the invention will be comprehensively understood in consideration of the following description with reference to the accompanying drawings and the claims.

BRIEF DESCRIPTION OF THE DRAWINGS

The present invention will be described in detail in the manner of examples and with reference to the accompanying drawings, wherein.

DETAILED DESCRIPTION OF THE PREFERRED EMBODIMENT

The present invention will be described in detail incorporating the accompanying drawings and the preferred embodiment as follows.

Figure 1:
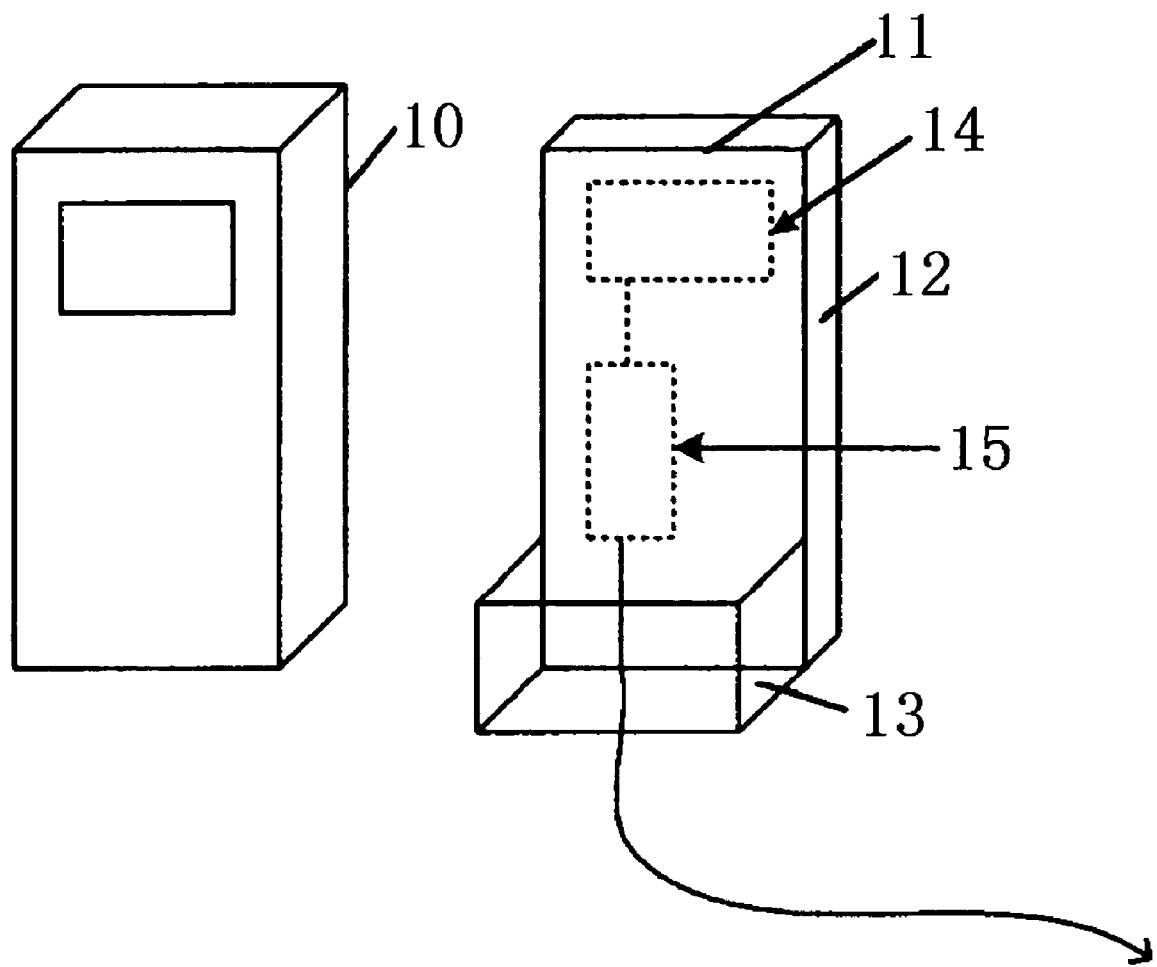
FIG. 1 is a diagram of the structure in which a mobile telephone is coupled with an adapter.

FIG. 1 is a diagram of the structure according to an embodiment of the invention in which a mobile telephone is coupled with an adapter. As shown in FIG. 1, the left side of the drawing is mobile phone 10, and the right side is adapter 11. Adapter 11 comprises a vertical frame 12 and a horizontal frame 13 fixed to the bottom of vertical frame 12. When mobile phone 10 being coupled with adapter 11, it is just necessary to insert mobile phone 10 into the frame of adapter 11 vertically, so that the back of mobile phone 10 is closely attached to vertical frame 12 of adapter 11, and the bottom of mobile phone 10 stays in horizontal frame 13 of adapter 11.

Coupling circuit section 14 and RF circuit 15 are accommodated in vertical frame 13 of adapter 11, and RF circuit 15 is coupled to the external antenna of adapter 11. When mobile phone 10 is coupled with adapter 11, the RF signal transmitted by mobile phone 10 enters the coupling circuit through the induction coupling and is not transmitted in the air through its own antenna any more. The coupling circuit of adapter 11 inputs the RF signal to the RF circuit of adapter 11, and the RF signal will be transmitted in the air by RF circuit 15 through antenna.

Figure 2:
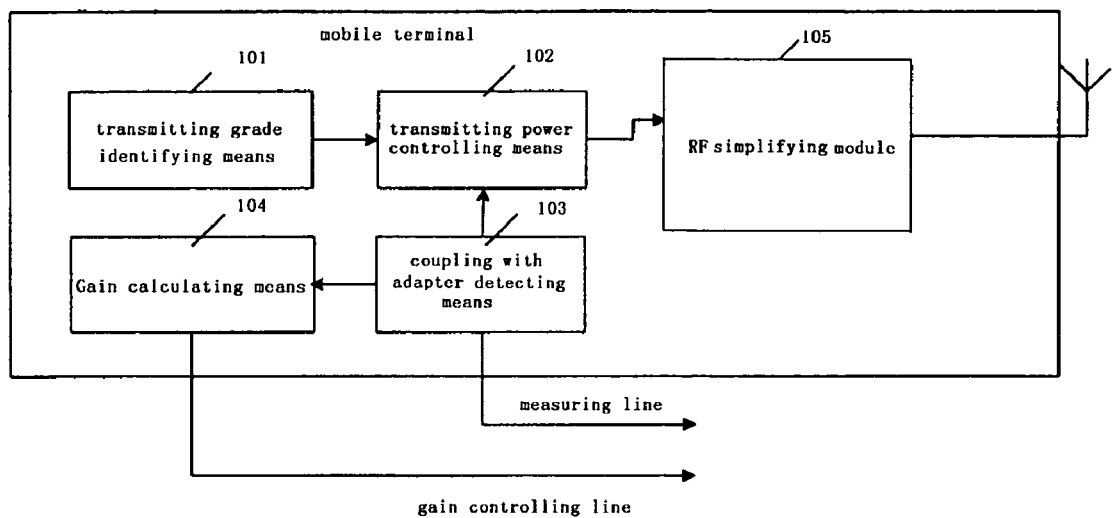
FIG. 2 is a portion of the electrical schematic diagram of a mobile telephone.

FIG. 2 is a portion of the electrical schematic diagram of a mobile terminal. Mobile terminal 10 comprises a transmitting grade identifying means 101 for judging what transmitting grade the mobile terminal is in; a transmitting power controlling means 102 for controlling the transmitting power of the mobile terminal; a gain calculating means 103 for calculating the gain of the transmitting power decreased by the mobile terminal itself; and a coupling with adapter detecting means 104 for detecting whether the mobile terminal is coupled with the adapter.

When mobile terminal 10 is coupled with adapter 11, the operating process is as follows: after a mobile telephone 10 is inserted into an adapter, that is, after the mobile phone is coupled with the adapter, when coupling with adapter detecting means 104 has detected mobile phone 10 being coupled with adapter 11, transmitting power controlling means 102 will decrease the transmitting power of the mobile phone. After being coupled with adapter 11, mobile phone 10 does not transmit signal through its own antenna any more.

The process of mobile terminal decreasing its own transmitting power is as follows: firstly, transmitting grade identifying means 101 judges whether the transmitting grade of mobile terminal 10 is between 5th and 9th grade in GSM or between zero and 3rd grade in DCS, if so, transmitting power controlling means 102 controls RF amplifying module 105 of the mobile terminal to decrease its own transmitting power by 10 dB. Moreover, a mobile telephone 10, that is, a mobile terminal whose transmitting power is neither between 5th and 9th grade in GSM nor between zero and 3rd grade in DCS, does not decrease its own transmitting power. Of course the transmitting grades can be those other than the above two, and the mobile terminal determines how much transmitting power will be decreased according to different cases.

Then, gain calculating means 104 calculates the gain of the transmitting power decreased by the mobile terminal itself and sends the gain value to the adapter through a gain controlling line, making the gain controlling means adjust the gain, thereby the adapter will compensate the power loss due to the RF coupling and the power decreased by the mobile terminal itself, the power loss due to the coupling by RF induction being measured by the adapter, and in this embodiment, being 10 dB. The measuring line may be a short-circuit measuring line, a voltage measuring line or other measuring line. Thus, the compensation must be 20 dB because the power transmitting is decreased by mobile terminal itself by 10 dB, and the power loss due to the coupling is 10 dB, that is, the gain controlling means must increase the transmitting power by 20 dB, so that the transmitted power from the antenna of the adapter can reach the due power level transmitted by the mobile terminal before it is coupled with the adapter.

Figure 3:
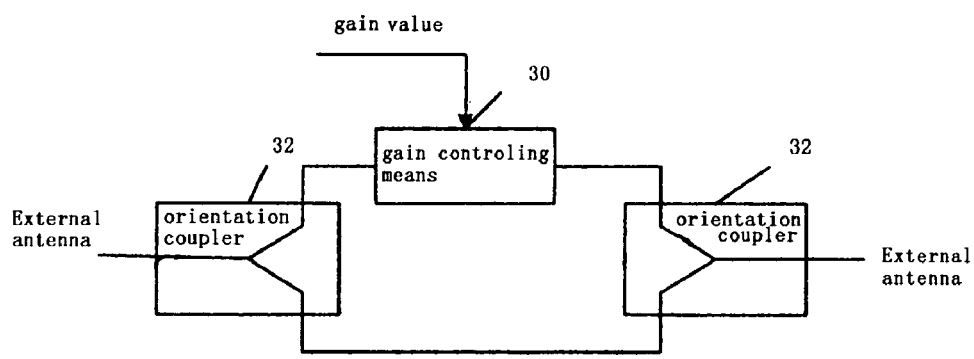
FIG. 3 is an electrical schematic diagram of the RF circuit in an adapter.

FIG. 3 is an electrical schematic diagram of the RF circuit in an adapter, which comprises a gain controlling means 30, an orientation coupler 32 and an external antenna. Gain controlling means 30 increases the gain according to the gain of the transmitting power decreased by the mobile phone itself, which is sent by gain calculating means 104 of mobile phone 10, and the measured power loss due to the RF coupling to compensate the power loss due to the coupling and the power decreased by the mobile terminal itself.

The gain controlling means has a plurality of variable gains. For example, the gain can be increased by 20 dB if the power loss due to the coupling is 10 dB, and the transmitting power decreased by mobile phone 10 itself is 10 dB; the gain can be increased by 10 dB if the power loss due to the coupling is 10 dB, and the transmitting power decreased by mobile phone 10 itself is zero. The gain controlling means is coupled with the external antenna through orientation coupler 32. The function of the orientation coupler is to separate transmitting circuit 33 from receiving circuit 34, that is, the function of duplex.

By way of the invention, the coupling by induction between the mobile terminal and the adapter is realized and the RF signal is coupled to the RF circuit of the adapter directly, it being unnecessary to provide an RF changeover switch in the mobile terminal and it being unnecessary to send the RF signal to the adapter using high-frequent signal, so that the structure of the invention will be simpler. Meanwhile, the transmitting power in vehicle is always maintained below the European standard because the mobile terminal decreases its own transmitting power when it detects itself being coupled with the adapter, while the RF property of the mobile terminal is not degraded, so that the normal and fine communication can be ensured.

While the invention is described incorporating the specific embodiment, it is apparent that those skilled in the art can make various alternatives, modifications and alterations according to the description above. The alternatives, modifications and alterations should be included in the present invention when they fall in the spirit and the scope of the appended claims.

The invention claimed is:

1. A method for coupling a mobile terminal with an adapter, the method comprising at least the following steps:

coupling the mobile terminal with the adapter by RF induction;

decreasing transmitted power of the mobile terminal so that RF power leaking around is maintained below a specified value when the mobile terminal detects that it has been coupled with the adapter; and controlling a gain of the adapter by the mobile terminal, so that the transmitted power from an antenna of the adapter can reach a due power level transmitted by the mobile terminal before the mobile terminal is coupled with the adapter wherein in order that the RF power leaking around is maintained below the specified value, the mobile terminal whose transmitting power is between 5th and 9th grade in GSM or between zero and 3rd grade in DCS decreases its transmitting power by 10 dB, a power loss due to the coupling by RF induction being assumed to be 10 dB, then the mobile terminal controls a higher gain 20 dB increased by an amplifying means of the adapter to compensate the transmitting power decreased by the mobile terminal itself and the power loss due to the coupling.

2. A method for coupling a mobile terminal with an adapter, the method comprising at least the following steps:

coupling the mobile terminal with said the adapter by RF induction; decreasing transmitted power of the mobile terminal so that RF power leaking around is maintained below a specified value when the mobile terminal detects that it has been coupled with the adapter; and controlling a gain of the adapter by the mobile terminal, so that the transmitted power from an antenna of the adapter can reach a due power level transmitted by the mobile terminal before the mobile terminal is coupled with the adapter wherein the mobile terminal whose transmitting power is neither between 5th and 9th grade in GSM nor between zero and 3rd grade in DCS does not decrease its own transmitting power, a power loss due to the coupling by RF induction being assumed to be 10 dB, then the mobile terminal controls a lower gain to 10 dB increased by an amplifying means of the adapter to compensate the transmitting power decreased by the mobile terminal itself and the power loss due to the coupling.

3. The method according to one of claims 1 and 2, wherein the coupling is capacitance coupling.

4. The method according to one of claims 1 and 2, wherein the specified value for RF leakage is below 20 mW.

5. A mobile terminal comprising:

a means for determining coupling with an adapter; and a means for decreasing transmitting power to maintain RF power leaking below a specified value when the mobile terminal is coupled with the adapter;

a gain calculating means for calculating a gain value decreased by the mobile terminal; and an amplifying means in the adapter to compensate for transmitting power decreased by the mobile terminal and a power loss due to RF coupling, so that the transmitted power from an antenna of the adapter can reach a due power level transmitted by the mobile terminal before the mobile terminal is coupled with the adapter;

wherein in order that the RF power leaking is maintained below a specified value, the mobile terminal whose transmitting power is between 5th and 9th grade in GSM or between zero and 3rd grade in DCS decreases its transmitting power by 10 dB, a power loss due to the coupling by RF induction being assumed to be 10 dB, then the mobile terminal controls a higher gain 20 dB increased by the amplifying means of the adapter to compensate for the transmitting power decreased by the mobile terminal itself and a power loss due to the RE coupling.

6. A mobile terminal comprising: a means for determining Coupling with an adapter; and a means for decreasing transmitting power to maintain RF power leaking below a specified value when the mobile terminal is coupled with the adapter; a gain calculating means for calculating a gain value decreased by the mobile terminal; and an amplifying means in the adapter to compensate for transmitting power decreased by the mobile terminal and a power loss due to RF coupling, so that the transmitted power from an antenna of the adapter can reach a due power level transmitted by the mobile terminal before the mobile terminal is coupled with the adapter; wherein a mobile terminal whose transmitting power is neither between 5th and 9th grade in GSM nor between zero and 3rd grade in DCS does not decrease its transmitting power, a power loss due to the coupling by RF induction being assumed to be 10 dB, then the mobile terminal controls a lower gain to 10 dB increased.

7. The mobile terminal according to one of claims 5 and 6, wherein said specified value for RF leakage is below 20 mW.

* * * * *